(12) United States Patent
Hashimoto

(10) Patent No.: US 6,290,397 B1
(45) Date of Patent: Sep. 18, 2001

(54) OOZE FLOW BEARING

(75) Inventor: Fukuo Hashimoto, North Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/200,683

(22) Filed: Nov. 30, 1998

(51) Int. Cl.$^7$ ........................................... F16C 33/66
(52) U.S. Cl. ................................................ 384/462
(58) Field of Search .................... 384/472, 462, 384/369, 292, 113

(56) References Cited

U.S. PATENT DOCUMENTS

| | | |
|---|---|---|
| 2,992,659 | 7/1961 | Thomas . |
| 3,730,599 | 5/1973 | Fingerle . |
| 3,804,476 | 4/1974 | Nakamura et al. . |
| 4,241,959 | * 12/1980 | Frister ................................ 384/472 |
| 4,576,489 | 3/1986 | Bentele et al. . |
| 4,609,293 | 9/1986 | Bayer et al. . |
| 4,797,011 | 1/1989 | Saeki et al. . |
| 4,942,944 | * 7/1990 | Frey et al. ........................... 384/472 |
| 5,066,145 | 11/1991 | Sibley et al. . |
| 5,320,433 | 6/1994 | Kimata et al. . |
| 5,489,190 | * 2/1996 | Sullivan ............................. 384/472 |
| 5,570,958 | 11/1996 | Tsukada . |
| 5,694,811 | 12/1997 | Tsukada . |

FOREIGN PATENT DOCUMENTS 562908 7/1944 (GB) .

OTHER PUBLICATIONS

Kingsbury, E., "Large Bearing Operation Without Retainer," ASLE Lubrication Engineering, vol. 35, 9, 517–520, Oct. 24–26, 1978.

Kingsbury, E., "Parched Elastohydrodynamic Lubrication," Journal of Tribology, vol. 107, 229–233, Apr. 1985.

Singer, Herbert B. and Gelotte, Erik, "Design of a High–Speed Reliable Ball Bearing," The Charles Stark Draper Laboratory, Inc., 1–6, May 1994.

Kingsbury, E., "Reliable, Economical Bearing Cartridge For Space Application," SBIR No. 04.04–2374, The Bearing Consultants, LLP, 1–19, Jul. 1996.

Francis, H. A., "The Design of Oozing Flow Lubricators For Retainerless Ball Bearings," The Charles Stark Draper Laboratory, Inc., 1–45, Oct. 1978–Jun. 1981.

Merriman, Terry L. and Kannel, Jerrold W., "Bearings in Space," Battelle, 1–16, Sep. 1997.

* cited by examiner

*Primary Examiner*—Lenard A. Footland
(74) *Attorney, Agent, or Firm*—Jones, Day, Reavis & Pogue

(57) ABSTRACT

A bearing having a rotating lubricant reservoir from which lubricant flows at a predictable metered rate through an ooze flow interface passage between two cylindrical reservoir surfaces that are precision machined smooth and overlap with a sealed interference fit. A precision turned shallow helical groove in one of the interface surfaces provides the interface passage through which lubricant flows at the predictable metered rate to the bearing rolling elements and raceways.

22 Claims, 6 Drawing Sheets

OOZE FLOW BEARING

BACKGROUND OF THE INVENTION

This application relates to the art of bearings and, more particularly, to bearing lubrication. The invention is particularly applicable to a cartridge bearing and will be described with specific reference thereto. However, it will be appreciated that the invention has broader aspects and can be used in any environment where metered lubricant flow is desired across an interface passage between two joined surfaces that do not move relative to one another.

Bearing cartridges may have a lubricant reservoir from which lubricant is metered at a very slow controlled rate to maintain a lubricant film on the bearing rolling elements and raceways. In one arrangement, the passages through which oil is metered are formed at interfaces between overlapping cylindrical surfaces of reservoir housing members that are secured together within an interference fit. Many different arrangements have been attempted for configuring the surfaces at the interface to insure a desired lubricant flow rate. If the flow rate is too slow or the passages become clogged, the bearing may overheat and fail. If the flow rate is too fast, the lubricant will be exhausted and the bearing may fail before the expiration of its intended design life. Excessive lubricant also is undesirable because it increases torque requirements on the bearing to overcome churning losses. By way of example, the surfaces at the interface have been roughened and etched to provide capillary-like passages for the flow of lubricant. However, such arrangements are difficult to reproduce accurately in mass production and the reject rate is high when lubricators are tested to insure that they meet the design flow rate before assembly into a finished bearing.

It would be desirable to have such a bearing lubricator with an interface passage that is configured to provide accurate and reliable flow of lubricant from the reservoir to the rolling elements and raceways, and that can be accurately reproduced in mass production with minimal rejects.

SUMMARY OF THE INVENTION

A bearing of the type described having a lubricant reservoir with an ooze flow interface passage between overlapping cylindrical smooth surfaces that are sealed together with an interference fit. One interface surface has at least one precision turned generally helical shallow groove through which lubricant flows at a mathematically determined metered flow rate.

In a preferred arrangement, an inner cylindrical surface on an outer lubricant reservoir housing member is precision machined smooth by grinding. An outer cylindrical surface on an inner lubricant reservoir housing member is precision turned smooth by hard turning or diamond turning.

In a preferred arrangement, the helical groove is precision turned by hard turning. However, it will be recognized that the groove might be machined by procedures other than hard turning with the use of a cutting tool that is tipped with a very hard material such as diamond, ceramic or cubic boron nitride.

The improved ooze flow interface passage of the present application is provided in a lubricant reservoir for a cartridge bearing having inner and outer races with rolling elements positioned in raceways between the races. The lubricant reservoir is positioned within the outer race between a pair of inner races, and may be mounted for rotation with the inner or outer races.

The reservoir has inner and outer reservoir housing members with overlapping cylindrical surface portions that are joined together with a leak tight sealed interference fit and include lubricant ooze flow interface passages located adjacent the rolling elements and raceways. During rotation of the reservoir, centrifugal force acting on the lubricant in the reservoir causes same to flow through the interface passages between the inner and outer lubricant reservoir housing members onto the rolling elements and raceways. In accordance with the present application, the interface passages are defined by at least one generally helical shallow groove that is precision turned in one of the overlapping surface portions.

It is a principal object of the present invention to provide an improved lubricant ooze flow interface passage between a pair of surfaces that are joined together with an interference fit.

It is another object of the invention to provide an improved bearing having a lubricant ooze flow interface passage that provides accurate and reliable metered flow of lubricant.

It is a further object of the invention to provide a lubricant ooze flow interface passage that can be mass produced with minimal rejects while providing a predictable and reliable lubricant flow rate.

DESCRIPTION OF A PREFERRED EMBODIMENT

Figure 1:
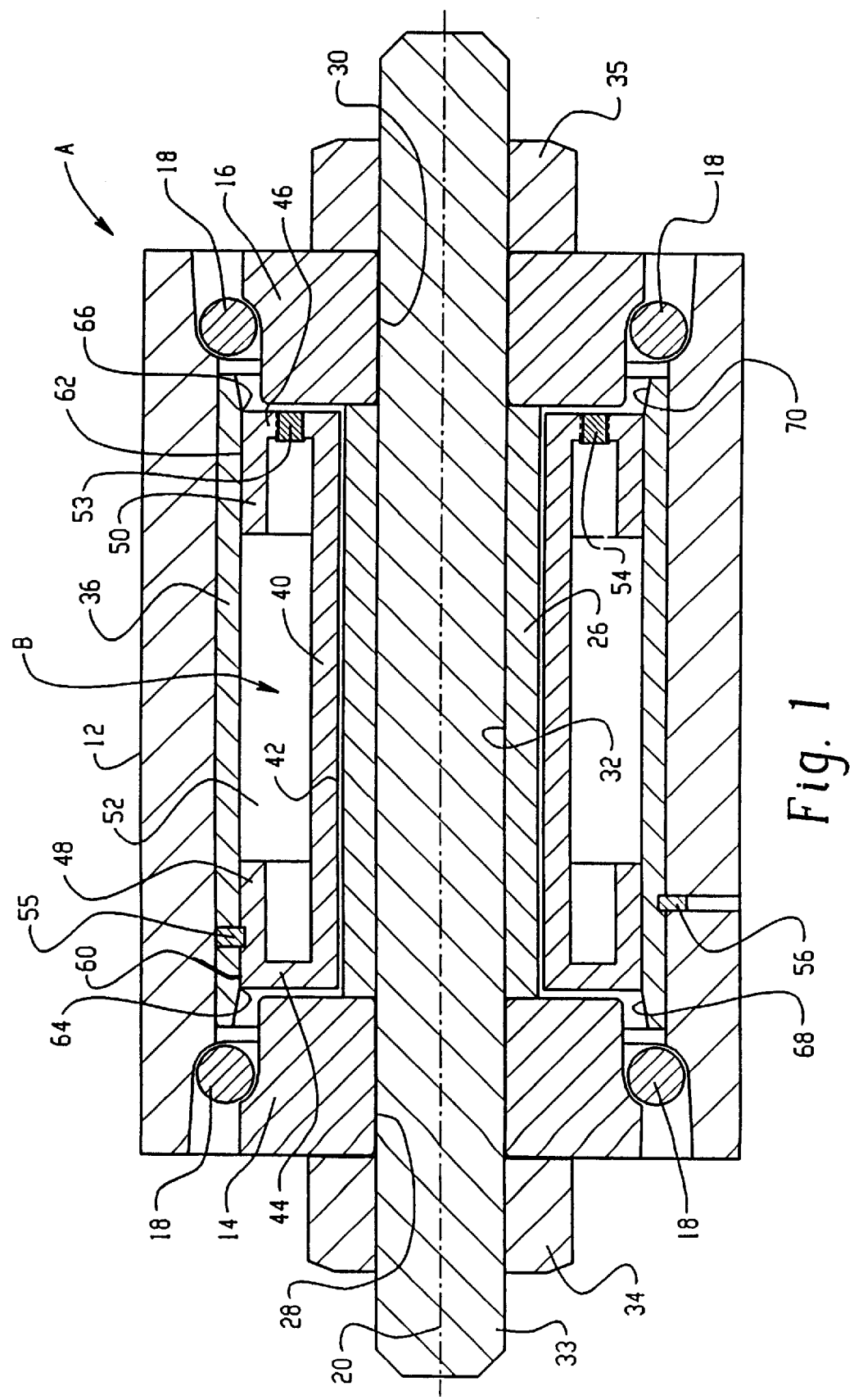
FIG. 1 is a cross-sectional elevational view of a bearing cartridge and lubricant reservoir constructed in accordance with the present application wherein the reservoir rotates with the outer bearing race.
Figure 2:
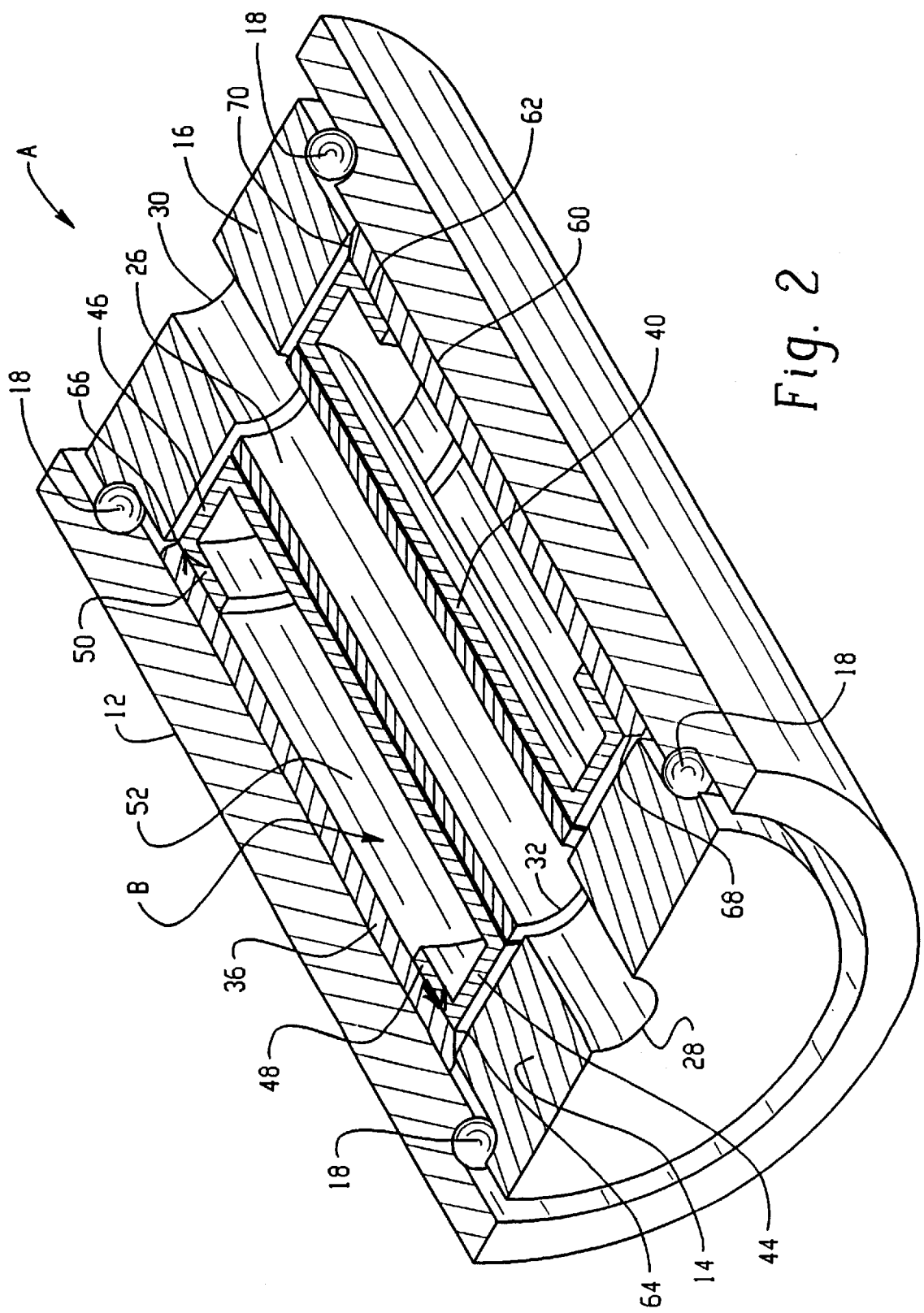
FIG. 2 is a cut-away perspective illustration thereof.

Referring now to the drawing, wherein the showings are for purposes of illustrating a preferred embodiment of the invention only and not for purposes of limiting same, FIG. 1 shows a bearing cartridge A having a cylindrical outer race 12 and a pair of spaced-apart inner races 14, 16. A plurality of rolling elements 18 are positioned in raceways between outer race 12 and inner races 14, 16 to provide relative rotation between the inner and outer races about longitudinal rotational axis 20. Although rolling elements 18 are illustrated as balls in the preferred arrangement, it will be recognized that other types of rolling elements can be used for some purposes. In an arrangement that has been tested, there are twenty one stainless steel balls associated with each inner race, and the balls are coated with titanium carbide to reduce lubrication requirements. The tested bearing also was full complement which means that there is no cage or retainer present separating the balls.

A cylindrical spacer sleeve 26 coincidental with axis 20 is positioned between inner races 14, 16. Cylindrical holes of the same size and that are concentric with axis 20 are provided at 28 and 30 in inner races 14, 16 and at 32 in spacer sleeve 26. These aligned holes provide a bearing through bore that receives a shaft 33 that is part of the device in which the bearing is installed. One end portion of the shaft usually has an enlargement outwardly of one of the inner races to provide a shoulder against which the adjacent race abuts. The opposite end portion of the shaft usually is externally threaded for receiving a fastener outwardly of the other inner race. Adjustment of the fastener secures the inner races against rotation relative to the shaft and adjusts the bearing end play to a preload that is determined by the bearing design and the application in which it is used. An enlargement and fastener on the shaft are generally indicated at 34 and 35 in FIG. 1. In the bearing that was tested, fastener 35 was adjusted to an end play preload of ten pounds. A flywheel or other rotational element may be mounted on outer race 12 for rotation therewith about axis 20.

An annular bearing lubricant reservoir B is attached to outer race 12 outwardly of rotational axis 20. Reservoir B includes an outer cylindrical lubricant reservoir housing member 36 that is an interference fit with the cylindrical inner surface of outer race 12 inwardly of rolling elements 18 and inner races 14, 16. A lubricant inner reservoir housing member 40 has a cylindrical hole 42 concentric with axis 20 and dimensioned to be a loose fit over spacer sleeve 26. Inner housing member 40 has integral radially extending disc flanges 44, 46 and inwardly extending cylindrical axial projections 48, 50 having outer cylindrical surfaces that are an interference fit within outer housing member 36.

A lubricant chamber 52 is defined between outer and inner reservoir housing members 36, 40. Suitable axial tapped holes are provided in flange 46 to allow filling of reservoir chamber 52 with lubricant, and plugs 53, 54 are then inserted into the holes. A suitable radial hole is drilled through outer reservoir housing member 36 and part way into cylindrical axial projection 48 on inner reservoir housing member 40 for receiving a pin 55 to lock the lubricant housing members together against relative movement.

Reservoir B is assembled, filled with lubricant and tested for lubricant flow. A reservoir that passes the required flow rate test is positioned within outer bearing race 12 with an interference fit. A suitable radial hole is drilled through outer bearing race 12 and part way into outer reservoir housing member 36 for receiving a pin 56 to lock outer bearing race 12 and reservoir B against relative movement. Pins 55 and 56 provide a positive means to lock the lubricant components together and to the outer bearing race rather than relying only on the interference fits.

Ooze flow interfaces 60, 62 are defined between inner cylindrical surface portions of outer lubricant reservoir housing member 36 and the outer cylindrical surfaces on axial projections 48, 50 of inner reservoir housing member 40. These overlapping surfaces of the inner and outer lubricant reservoir housing members are joined together with an interference fit that provides a seal against leakage of lubricant. Lubricant ooze flow interfaces 60, 62 include passages as hereinafter described having inlets communicating with lubricant chamber 50 and having outlets 64, 66 located adjacent to both rolling elements 18 and the inner cylindrical surface of outer bearing race 12. During rotation of outer race 12 and lubricant reservoir B, lubricant within chamber 52 is forced through the passages in ooze flow interfaces 60, 62 to outlets 64, 66 for coating rolling elements 18 and the raceways in which they roll with a lubricant film.

Adjacent the opposite ends of outer reservoir housing member 36, its inner peripheral surface is provided with outwardly sloping surfaces 68, 70 that lie on the surface of a cone. These sloping surfaces are located axially outward of reservoir B and intersect interface passage outlets 64, 66 so that lubricant flows across the sloping surfaces toward balls 18. Centrifugal force aids the flow of lubricant along sloping surfaces 68, 70 and onto the balls and raceways. Each of sloping surfaces 68, 70 slopes outwardly from the inner peripheral surface of outer reservoir housing member at an angle of 5–20° and more preferably within 20% of 12°. The end portions of outer reservoir housing member 36 extend axially beyond the ends of inner reservoir housing member 40 so that sloping surfaces 68, 70 are axially beyond outlets 64, 66. In one example, outer reservoir housing member 36 has an outer diameter of 0.8892–0.8895 inches (22.586–22.593 mm) and an inner diameter of 0.7872–0.7876 inches (19.995–20.005 mm). The axial length of sloping surface portions 68, 70 is 0.072–0.074 inches (1.829–1.880 mm) which is slightly less than the radial thickness of the outer reservoir housing member. The sloping surface portions facilitate assembly of the lubricant reservoir as well as direct the flow of lubricant.

Inner and outer reservoir housing members 36, 40 preferably are made of steel having small carbides to allow cleaner and smoother machining, along with the ability to maintain more consistent close tolerances. One example of a suitable material is 440NDur available from The Timken Company. This is a corrosion resistant stainless steel with increased amounts of chrome and nickel, and having small carbides and a high hardness of 60 on the Rockwell C scale. Smaller carbides in the metal allow clean and smooth machining.

Each of the outer and inner reservoir members 36 and 40 has a cylindrical surface at the ooze flow interfaces 60 and 62, and these surfaces are precision machined to be very smooth. In one arrangement, the inner diameter of the outer lubricant reservoir housing member is precision machined to a very smooth finish by grinding while the outer diameter of the cylindrical end portions are precision machined to a very smooth finish by precision turning. Although it is possible to grind the outer diameter of the inner lubricant reservoir housing member to a very smooth finish, precision turning facilitates manufacture because it is possible to proceed immediately with turning of a helical groove as hereinafter described without having to make a new setup.

Precision turning preferably is done by hard turning which means that the surface being turned has a hardness on the Rockwell C scale that is greater than 30, more preferably greater than 45 and most preferably greater than 55. Cutting tools that are tipped with a ceramic or with cubic boron nitride commonly are used to machine hardened steel that has a hardness greater than 30 on the Rockwell C scale. A diamond tipped cutting tool also can be used, especially for precision turning other than hard turning.

Examples of surface roughness that follow are in accordance with the ISO standard designation Ra for surface roughness. In a prototype, the inner surface of outer lubricant reservoir housing member 36 had a surface roughness of around 4 μinches Ra (0.102 μm) as measured with a Federal 5000 surface analyzer using a small bore tip probe. This surface roughness preferably is less than 10 μinches Ra (0.25 μm) more preferably less than 7 μinches Ra (0.178 μm) and most preferably less than 5 μinches Ra (0.127 μm). The outer surfaces of cylindrical projections 48, 50 on inner lubricant reservoir housing member 40 had a surface roughness of around 15 μinches Ra (0.381 μm) as measured with a surface mapping microscope. This surface roughness preferably is less than 25 μinches Ra (0.635 μm), more preferably less than 20 μinches Ra (0.508 μm) and most preferably less than 16 μinches Ra (0.406 μm).

Figure 5:
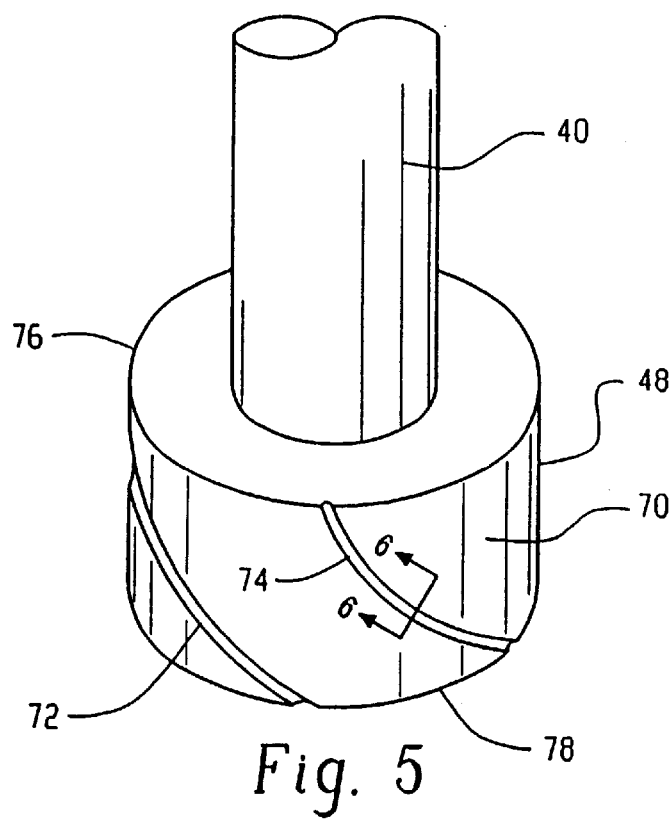
FIG. 5 is a perspective illustration showing generally helical grooves in an outer cylindrical surface of an inner reservoir housing member that forms part of an ooze flow interface passage with an inner surface of an outer reservoir housing member.

The external cylindrical surfaces of axial projections 48, 50 on inner lubricant reservoir housing member 40 has at least one generally helical groove precision machined therein leading from lubricant chamber 52 to outlets 64, 66. FIG. 5 shows outer cylindrical surface 70 of axial cylindrical projection 48 on inner lubricant reservoir housing member 40 with parallel helical grooves 72, 74 machined therein. Each groove intersects and opens outwardly at end 76 to communicate with the lubricant chamber and at end 78 that corresponds to outlet 64 for discharging lubricant. Thus, each groove is continuous between a groove inlet at the lubricant chamber and a groove outlet that corresponds with the interface passage outlet. The grooves may be 180° apart or have other spacing relationships and may also have different pitches or be in opposite directions so that they intersect or cross one another. Grooves that are substantially parallel and of the same shape and length facilitates the mathematical calculations that are performed to predict the lubricant flow rate. The groove may have a variable pitch and does not have to be truly helical. For example, the groove can generally spiral along the outer surface in both circumferential and axial directions. The important consideration is that the groove has a continuous length that is greater than the straight line axial distance from the lubricant reservoir chamber to the interface passage discharge outlet. At least two grooves provide redundancy and also make it possible to use grooves having a smaller cross-sectional area for a given flow rate. The pitch of the grooves may vary depending on the desired flow rate as a longer groove provides greater resistance to flow or head loss, and this results in a slower flow rate. Also, a groove having a greater depth and/or cross-sectional area can be made to have approximately the same flow rate as a smaller groove by making it longer.

Figure 6:
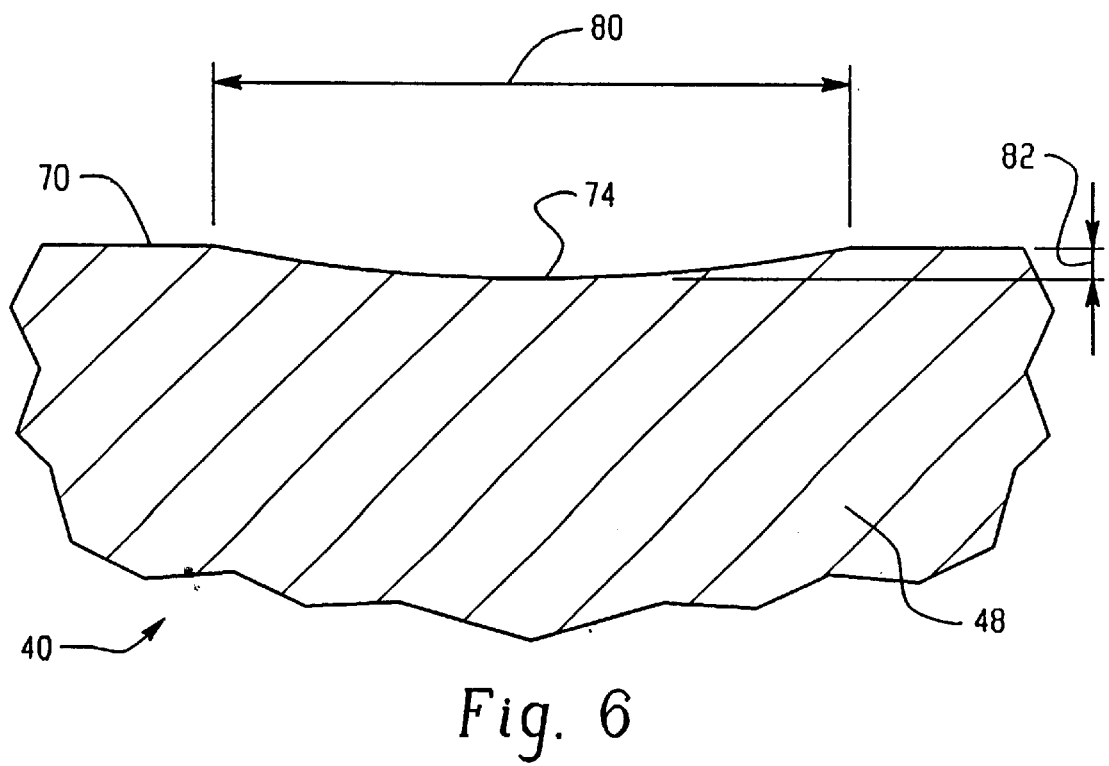
FIG. 6 is a cross-sectional elevational view of a groove that is formed in an outer surface of an inner reservoir housing member.

FIG. 6 shows groove 74 as having a width 80 and a maximum depth 82. The groove is smoothly curved across its width on a circular arc created from the radius of the cutting tool, and the maximum depth is at the center of the width. The cross-sectional area of a groove is between $2.17 \times 10^6 - 9.30 \times 10^6$ μin² (1400–6000 μm²), more preferably $2.48 \times 10^6 - 6.20 \times 10^6$ μin² (1600–4000 μm²) and most preferably $2.79 \times 10^6 - 3.10 \times 10^6$ μm² (1800–2000 μm²). This corresponds to a maximum groove depth that is less than 1181.1 μinches (30 μm), more preferably less than 787.4 μinches (20 μm) and most preferably less than 393.7 μinches (10 μm).

The groove preferably has a width that is at least 20 times the maximum groove depth, and also preferably has the same cross-sectional size and shape along its entire length. In addition, the groove preferably has a width of at least 5511.8 μinches (140 μm).

The depth of the grooves has a major influence on the lubricant flow rate and must be closely controlled. For the same flow rate, a shallower groove depth allows a shorter groove length than a deeper groove. Shallower grooves reduce the cutting force and thereby minimize the deflections that occur during machining to allow for more controlled and consistent grooves. The feed rate of the cutting tool and the rotational speed of the part also must be closely controlled during precision machining to obtain consistent grooves and desired surface finishes. The grooves having dimensions given by example have been machined using a 1/64 inch (0.397 mm) radius DNMA 331, 35 degree CBN cutting tool.

In an arrangement that has been tested, the axial overlapping length of each interface passage 60, 62 from lubricant chamber 52 to discharge end 64 or 66 is 0.25 inches (6.35 mm). The diameter of the outer cylindrical surfaces on axial projections 48, 50 is 0.794–0.796 inches (20.168–20.218 mm). The generally helical grooves are pitched at around 0.157 inch (4 mm) so that each groove has a length of approximately 3.937 inches (10 cm). The mathematically determined acceptable flow rate for the designed application was $1.1 \times 10^{-3} - 1.1 \times 10^7$ pounds per hour (5–50 micrograms per hour) for each bearing row, with $4.4 \times 10^{-8}$ pounds per hour (20 micrograms per hour) being the goal. For a flow rate of $4.4 \times 10^{-8}$ pounds per hour (20 micrograms per hour) for each bearing row, each groove would have a flow rate of $2.2 \times 10^{-8}$ pounds per hour (10 micrograms per hour). This will provide a bearing life of at least 15 years at the designed application rotational speed of 12,000 RPM. Obviously, the flow rate varies with the rotational speed due to changes in centrifugal force acting on the lubricant within the reservoir. The flow rate is independently determined for each design application.

The groove dimensions and pitch can be changed to account for variations in required flow rate, and for changes in such variables as lubricant viscosity, bearing size, rotational speed and operating temperature. All of these parameters are adjustable to optimize bearing performance and maximize bearing life which is determined by exhaustion of lubricant from the reservoir.

Figure 3:
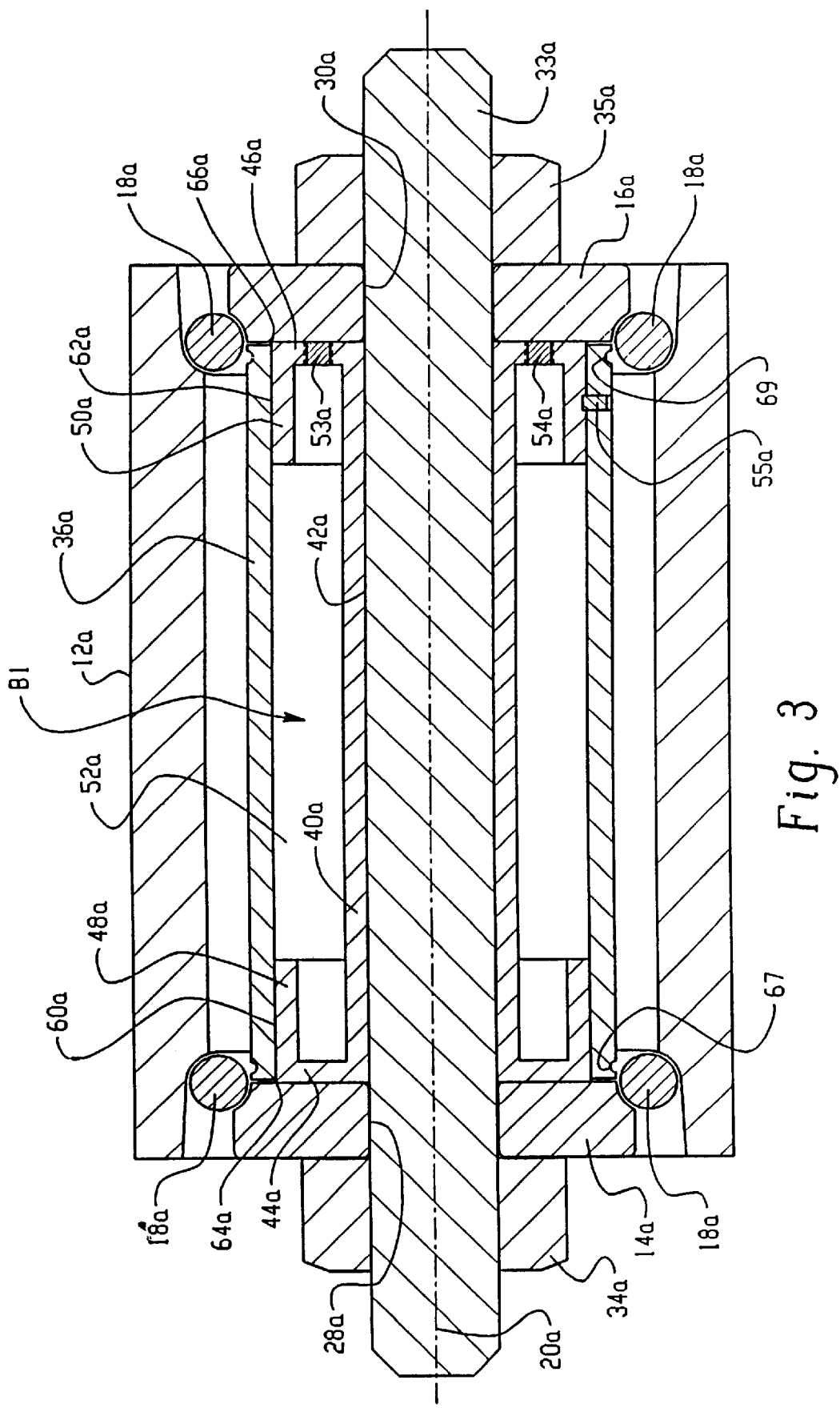
FIG. 3 is a cross-sectional elevational view of another embodiment wherein the lubricant reservoir rotates with the inner bearing race.

FIG. 3 shows another arrangement wherein outer bearing race 12a is stationary while inner bearing races 14a, 16a rotate along with lubricant reservoir B1. A rotatable member would be attached for rotation with shaft 33a. In this arrangement, balls 18 are positioned in raceways between outer bearing race 12a and inner bearing races 14a, 16a which rotate about axis 20a with shaft 33a. Inner reservoir housing member 40a serves as the spacer between inner bearing races 14a, 16a and has a central axial bore 42a closely received on shaft 33a. The shaft 33a is provided with an enlargement 34a and an adjustable fastener 35a to adjust the bearing end play and provide the desired axial preload.

Interface passages 60a, 62a are provided between the outer cylindrical surfaces of cylindrical axial projections 48a, 50a and inner surface portions of outer reservoir housing member 36a as in the embodiment of FIG. 1. Outlets 64a, 66a from the interface passages are approximately centered on the ball rows radially inwardly thereof. The opposite ends of outer reservoir housing member 36a are axially-spaced from the opposed faces of inner bearing races 14a, 16a to allow flow of oil therepast to the ball rows.

Spaced slightly inwardly from its opposite ends, the outer surface of outer reservoir housing member 36a has smoothly curved circumferential notches 67, 69 extending 360° therearound. These notches have a circular arcuate cross-sectional shape and prevent oil from migrating along the outer surface of outer bearing housing member 36a toward the center thereof. In other words, the notches retain the oil in the immediate vicinity of the ball rows where it can be thrown outwardly by centrifugal force onto the balls.

In the embodiment of FIG. 3, the outer cylindrical surface of the reservoir is spaced radially inwardly from the inner peripheral surface of outer bearing race 12a. Disc flanges 44a, 46a have axial cylindrical projections 48a, 50a thereon, and plugs 53a close the holes provided in flange 46a for filling chamber 52a with lubricant. Inner and outer reservoir housing members 36a, 40a are locked together by a pin 55a. The other features of the embodiment of FIG. 3 are as described with respect to the embodiment of FIGS. 1, 2, 5 and 6.

Figure 4:
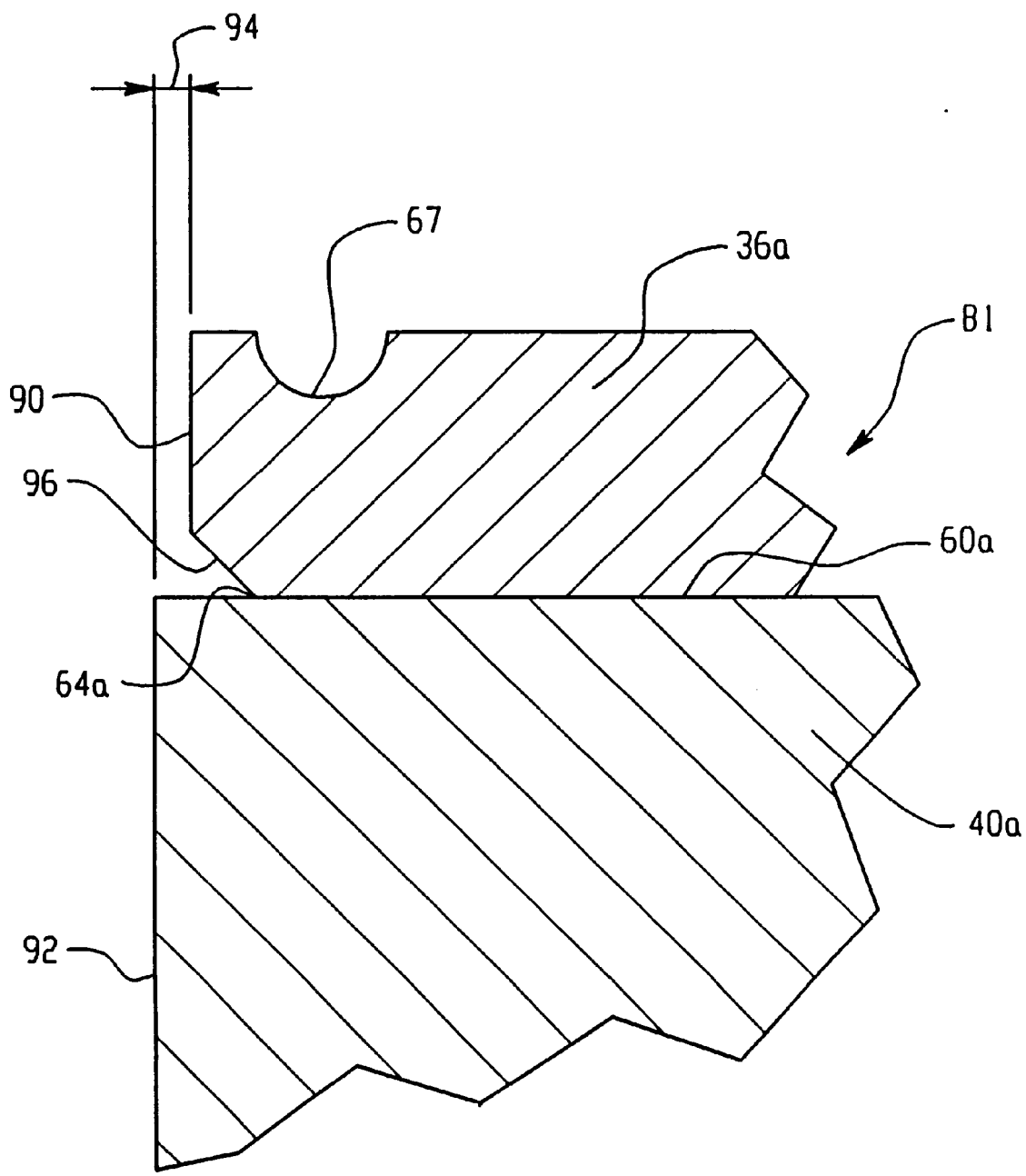
FIG. 4 is an enlarged partial cross-sectional elevation view of an end portion of the interface passage between the inner and outer reservoir housing members for the embodiment of FIG. 3 wherein the reservoir rotates with the inner bearing race.

The axial length of outer reservoir housing member 36a is slightly less than the axial length of inner reservoir housing member 40a. This spaces the opposite ends of outer reservoir housing member 36a axially inward from the opposite ends of inner reservoir housing member 40a. FIG. 4 shows end 90 of outer reservoir housing member 36a spaced axially inward from end 92 of inner reservoir housing member 40a. In one example, outer reservoir housing member 36a has an axial length of 1.497 inches (3.802 cm) while inner reservoir housing member 40a has an axial length of 1.485–1.490 inches (3.772–3.785 cm). Thus, the spacing shown at 94 in FIG. 4 between end surfaces 90 and 92 is less than ten thousandths of an inch (0.254 mm) and more preferably less than five thousandths of an inch (0.127 mm). At the intersection with interface 60a, end surface 90 is sloped as indicated at 96. The included angle between sloping surface 96 and interface 60a is 30–60°, and more preferably within 5° of 45°. The axial length of sloping surface 96 parallel to interface 60a is about the same as distance 94. This sloping surface facilitates assembly of the inner lubricant reservoir housing member within the outer lubricant reservoir housing member and also provides an annular recess in which lubricant may be distributed as it exits from the two grooves at outlet 64a. Centrifugal force then causes the lubricant to flow between end surface 90 and the opposed end face of adjacent inner bearing race 14a to balls 18.

Figure 7:
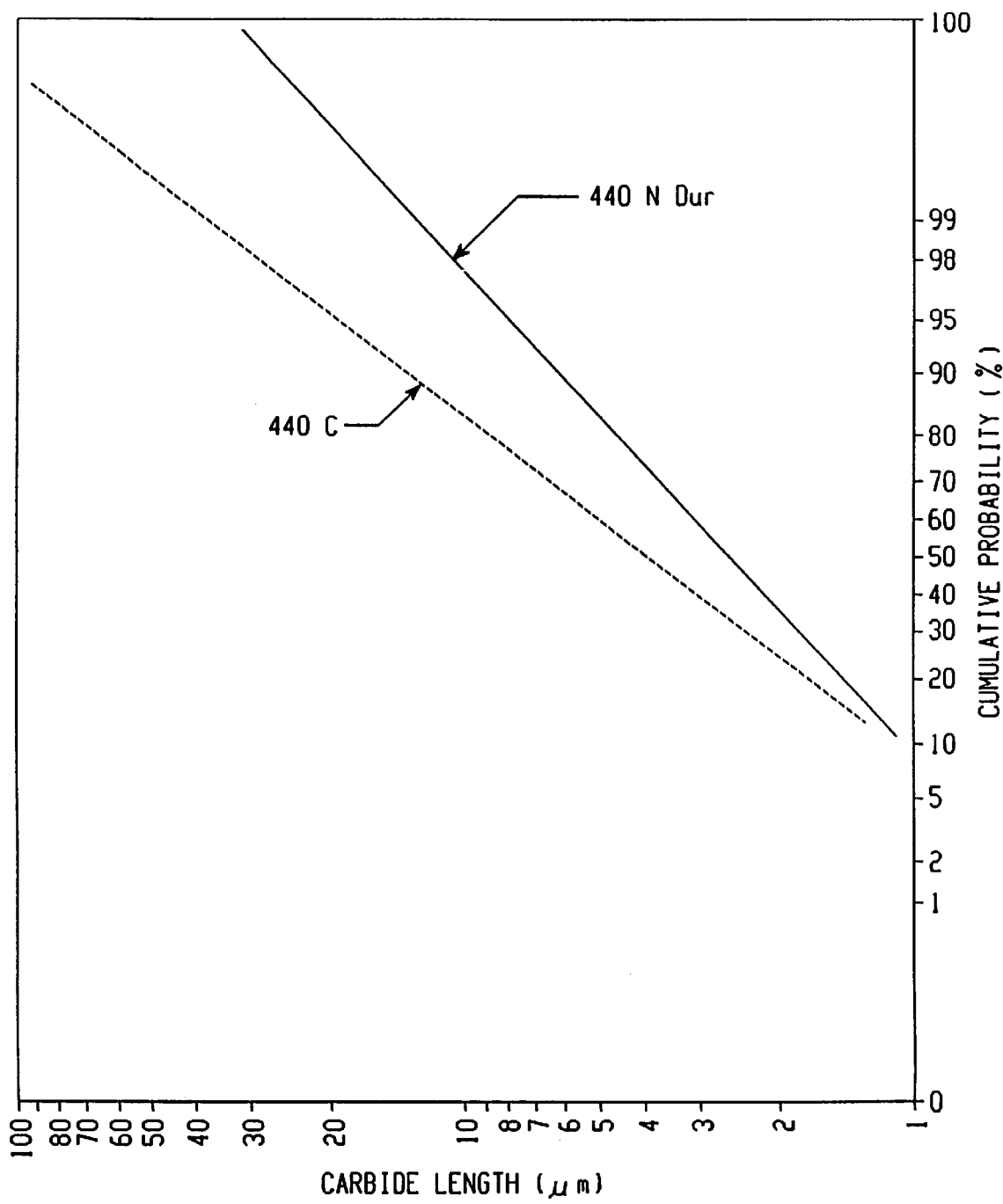
FIG. 7 is a graph showing the cumulative probability percentage of carbide lengths in 440NDur and in 440C.

As previously mentioned, it is desirable to use a stainless steel that has very small carbides in order to obtain smooth finishes. FIG. 7 shows the approximate cumulative probability percentage of carbide lengths in 440NDur and 440C, both being stainless steels available from The Timken Company. As indicated on the graph, 60% of the carbides in 440NDur are smaller than 118.1 $\mu$inch (3 $\mu$m), whereas only 40% of the carbides in 440C are smaller than 118.1 $\mu$inch (3 $\mu$m). Also, 90% of the carbides in 440NDur are smaller than 236.2 $\mu$inch (6 $\mu$m) whereas only 65% of the carbides in 440C are smaller than 236.2 $\mu$inch (6 $\mu$m). The range of carbide sizes that are suitable is not known, and 440C stainless steel may be suitable for some purposes depending on the size of the reservoir, the flow rate and the groove size. Obviously, for larger groove sizes, it may be possible to use steels that have larger carbides. The use of diamond turning also may make it possible to use steels that have larger carbides. For the extremely small grooves, a steel having larger carbides would not provide grooves of as high a quality due to possible carbide pull out at the bottoms of the grooves, and this would lead to a more inconsistent flow rate because of the partially obstructed flow path. The carbide sizes in 440NDur is given simply by way of example to disclose a preferred embodiment and should not be taken by way of limitation.

In this application, an interference fit means a shrink fit. The overlapped cylindrical surfaces that provide the interface passages are shrunk fit together in a process that uses 0.0006 to 0.0012 inches (0.015–0.030 mm) of radial interference. Obviously, the surfaces could be joined together in sealed relationship by other procedures such as press fitting. The term precision machined, precision machining, precision turned and precision turning means that parts and surfaces are machined or turned to dimensions on the micron level. The term hard turned and hard turning means that the steel had a hardness greater than 30 on the Rockwell C scale, more preferably greater than 45 and most preferably greater than 50 when its surface was provided with a smooth finish or with generally helical grooves by precision machining.

The inner and outer lubricant reservoir housing members have plane end faces that extend perpendicular to the bearing rotational axis. In the embodiment of FIG. 1, the opposite end faces of the outer lubricant reservoir housing member are spaced axially outward from the opposite end faces of the inner lubricant reservoir housing member and from the interface passage outlets. In the embodiment of FIG. 3, the opposite end faces of the inner lubricant reservoir housing member are spaced outwardly from the opposite end faces of the outer lubricant reservoir housing member and from the interface passage outlets.

In the embodiment of FIG. 3, the sloping surface shown at 96 in FIG. 4 is a circumferential bevel between the interface passage and an end face of the outer lubricant reservoir housing member. The bevel also intersects the interface passage outlet.

In the embodiment of FIG. 1, sloping surfaces 68, 70 are on axially projecting end portions of outer reservoir housing member 36, and project beyond both the end faces of inner lubricant reservoir housing member 40 and interface passage outlets 64, 66.

Interface passage outlets 64, 66 in FIG. 1 are radially aligned with balls 18 and spaced axially inward thereof In FIG. 3, outlets 64a, 66a are axially aligned with balls 18 and spaced radially inward thereof These arrangements enhance the flow of lubricant toward the ball rows and raceways. The interfaces that are joined together with an interference fit are leak tight against passage of lubricant. Therefore, the flow of lubricant takes place only through the groove, and only when the bearing is operating (lubricator spinning). This makes it possible to provide a predictable metered flow rate by properly designing the length and size of the groove for each application.

Although the invention has been shown and described with reference to a cartridge bearing having a single outer race, it will be recognized that the invention can be used in bearings having a pair of outer races as well as in bearings other than cartridge bearings.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed is:

1. In a bearing having inner and outer races and a bearing rotational axis, one of said inner and outer races being a rotational race that rotates about said axis relative to the other of said inner and outer races, rolling elements between said inner and outer races for providing rotation of said rotational race about said axis relative to said other race, at least said inner race including a pair of spaced-apart inner races that are spaced-apart along said axis, an annular lubricant reservoir between said pair of spaced-apart inner races outwardly of and surrounding said axis, said lubricant reservoir being rotatable with said rotational race about said axis, said reservoir having lubricant discharge passages with outlets adjacent said rolling elements, said reservoir including inner and outer reservoir housing members having interface surfaces that are secured together against movement relative to one another and are sealed together against lubricant leakage therepast, said interface surfaces on one of said inner and outer reservoir housing members being precision machined with a smooth finish and said interface surfaces on the other of said inner and outer reservoir housing members being precision turned with at least one generally helical groove therein extending continuously from the lubricant reservoir to said outlets to form said lubricant discharge passages, whereby said at least one groove in each of said interface surfaces on the other of said inner and outer reservoir housing members provides the only passages through which lubricant is metered from said reservoir to said rolling elements under the influence of centrifugal force during rotation of said reservoir, and lubricant that is discharged from said reservoir through said discharge passages is not returned to said reservoir.

2. The bearing of claim 1 wherein said inner and outer lubricant reservoir housing members are of stainless steel having a high hardness and small carbides.

3. The bearing of claim 2 wherein said stainless steel has a hardness greater than 30 on the Rockwell C scale.

4. The bearing of claim 1 wherein each of said surfaces having said groove therein has at least two of said generally helical grooves therein that extend parallel to one another.

5. The bearing of claim 1 wherein said precision turned groove is hard turned.

6. A generally cylindrical interface between two members and across which lubricant oozes from a reservoir end to a discharge end, said two members being secured together at said interface against movement relative to one another and each of said members having a surface at said interface, one of said surfaces being precision machined with a smooth finish and the other of said surfaces having a precision turned smooth finish with at least one precision turned generally helical groove therein extending from said reservoir end to said discharge end, and said groove having a cross-sectional area between 1400–6000 $\mu m^2$.

7. A generally cylindrical interface between two members and across which lubricant oozes from a reservoir end to a discharge end, said two members being secured together at said interface against movement relative to one another and each of said members having a surface at said interface, one of said surfaces being precision machined with a smooth finish and the other of said surfaces having a precision turned smooth finish with at least one precision turned generally helical groove therein extending from said reservoir end to said discharge end, said groove having a width and a maximum depth, and said width being at least 20 times said maximum depth.

8. A generally cylindrical interface between two members and across which lubricant oozes from a reservoir end to a discharge end, said two members being secured together at said interface against movement relative to one another and each of said members having a surface at said interface, one of said surfaces being precision machined with a smooth finish and the other of said surfaces having a precision turned smooth finish with at least one precision turned generally helical groove therein extending from said reservoir end to said discharge end, and said two members being of stainless steel having small carbides and a hardness greater than 55 on the Rockwell C scale.

9. A generally cylindrical interface between two members and across which lubricant oozes from a reservoir end to a discharge end, said two members being secured together at said interface against movement relative to one another and each of said members having a surface at said interface, one of said surfaces being precision machined with a smooth finish and the other of said surfaces having a precision turned smooth finish with at least one precision turned generally helical groove therein extending from said reservoir end to said discharge end, said surface with said groove therein having a surface roughness that is less than 0.508 $\mu m$ Ra, and the other of said surfaces having a surface roughness that is less than 0.25 $\mu m$ Ra.

10. In a cylindrical lubricant reservoir having opposite ends and being rotatable about a longitudinal axis that extends between said opposite ends, said reservoir having an annular lubricant chamber surrounding said axis between said opposite ends, said reservoir having inner and outer housing members fitted together at interfaces that surround said axis radially outwardly therefrom adjacent said opposite ends and extend generally parallel to said axis, each of said inner and outer housing members having interface surfaces at said interfaces, said interface surfaces on one of said inner and outer housing members being precision machined with a smooth finish and said interface surfaces on the other of said inner and outer housing members having at least one precision turned generally helical groove extending continuously between said lubricant chamber and said ends to provide interface passages through which lubricant flows from said reservoir, said interface surfaces on said inner and outer housing members being joined together in leak tight relationship so that lubricant may pass through said interfaces from said reservoir only through said groove.

11. The reservoir of claim 10 wherein said surfaces on the other of said inner and outer members have at least two generally helical grooves therein extending substantially parallel to one another between said lubricant chamber and said ends.

12. The reservoir of claim 10 wherein said surface having said groove therein is on said inner housing member.

13. The reservoir of claim 10 wherein said precision turned groove is hard turned.

14. A generally cylindrical interface between two members and across which lubricant oozes from a reservoir end to a discharge end, said two members being secured together at said interface against movement relative to one another and each of said members having an interface surface at said interface, one of said interface surfaces being precision machined with a smooth finish and the other of said interface surfaces having a precision turned smooth finish with at least one precision turned generally helical groove therein extending from said reservoir end to said discharge end, said interface surfaces being sealed against passage of lubricant thereacross from said reservoir so that lubricant may pass across said interface from said reservoir to said discharge end only through said groove.

15. The interface of claim 14 including at least two generally helical grooves extending substantially parallel to one another between said reservoir end and said discharge end.

16. The interface of claim 14 wherein said precision turned smooth finish and said precision turned groove are hard turned.

17. The interface of claim 14 wherein said groove has a groove bottom and a groove width, said groove bottom being smoothly curved along a circular arc across said width, and said groove having a maximum groove depth at the midpoint of said groove width.

18. In a bearing having an outer race and a pair of spaced-apart inner races, rolling elements between said inner and outer races for providing relative rotation therebetween about a bearing rotational axis, a lubricant reservoir between said inner races outwardly of and surrounding said axis, said reservoir having lubricant discharge passages with outlets adjacent said rolling elements, said discharge passages including interfaces between surfaces on inner and outer reservoir housing members that are sealed together against lubricant leakage, said surfaces on one of said inner and outer housing members being precision machined with a smooth finish and said surfaces on the other of said inner and outer housing members being precision turned with at least one generally helical groove therein extending continuously from the lubricant reservoir to said outlets of said lubricant discharge passages, and said groove having a cross-sectional area between 1400–6000 $\mu m^2$.

19. In a bearing having an outer race and a pair of spaced-apart inner races, rolling elements between said inner and outer races for providing relative rotation therebetween about a bearing rotational axis, a lubricant reservoir between said inner races outwardly of and surrounding said axis, said reservoir having lubricant discharge passages with outlets adjacent said rolling elements, said discharge passages including interfaces between surfaces on inner and outer reservoir housing members that are sealed together against lubricant leakage, said surfaces on one of said inner and outer housing members being precision machined with a smooth finish and said surfaces on the other of said inner and outer housing members being precision turned with at least one generally helical groove therein extending continuously from the lubricant reservoir to said outlets of said lubricant discharge passages, and said groove having a width that is at least 20 times the maximum groove depth.

20. In a bearing having an outer race and a pair of spaced-apart inner races, rolling elements between said inner and outer races for providing relative rotation therebetween about a bearing rotational axis, a lubricant reservoir between said inner races outwardly of and surrounding said axis, said reservoir having lubricant discharge passages with outlets adjacent said rolling elements, said discharge passages including interfaces between surfaces on inner and outer reservoir housing members that are sealed together against lubricant leakage, said surfaces on one of said inner and outer housing members being precision machined with a smooth finish and said surfaces on the other of said inner and outer housing members being precision turned with at least one generally helical groove therein extending continuously from the lubricant reservoir to said outlets of said lubricant discharge passages, and said groove having a maximum depth that is not greater than 30 $\mu m$.

21. In a bearing having an outer race and a pair of spaced-apart inner races, rolling elements between said inner and outer races for providing relative rotation therebetween about a bearing rotational axis, a lubricant reservoir between said inner races outwardly of and surrounding said axis, said reservoir having lubricant discharge passages with outlets adjacent said rolling elements, said discharge passages including interfaces between surfaces on inner and outer reservoir housing members that are sealed together against lubricant leakage, said surfaces on one of said inner and outer housing members being precision machined with a smooth finish and said surfaces on the other of said inner and outer housing members being precision turned with at least one generally helical groove therein extending continuously from the lubricant reservoir to said outlets of said lubricant discharge passages, and said lubricant reservoir housing surfaces having a roughness that is less than 0.635 $\mu m$ Ra.

22. In a bearing having an outer race and a pair of spaced-apart inner races, rolling elements between said inner and outer races for providing relative rotation therebetween about a bearing rotational axis, a lubricant reservoir between said inner races outwardly of and surrounding said axis, said reservoir having lubricant discharge passages with outlets adjacent said rolling elements, said discharge passages including interfaces between surfaces on inner and outer reservoir housing members that are sealed together against lubricant leakage, said surfaces on one of said inner and outer housing members being precision machined with a smooth finish and said surfaces on the other of said inner and outer housing members being precision turned with at least one generally helical groove therein extending continuously from the lubricant reservoir to said outlets of said lubricant discharge passages, and said surfaces that have said groove therein having a roughness that is less than 0.508 $\mu m$ Ra and the other of said surfaces having a roughness that is less than 0.25 $\mu m$ Ra.

* * * * *